United States Patent [19]

Neher

[11] 4,299,413

[45] Nov. 10, 1981

[54] PIPE COUPLING

[75] Inventor: Martin D. Neher, Burkburnett, Tex.

[73] Assignee: Ciba-Geigy Corporation, Ardsley, N.Y.

[21] Appl. No.: 52,228

[22] Filed: Jun. 26, 1979

[51] Int. Cl.³ ............................................. F16L 35/00
[52] U.S. Cl. .................................... 285/114; 285/15; 285/373; 285/423
[58] Field of Search ............... 285/372, 114, 187, 302, 285/301, 373, 15, 423, 419

[56] References Cited

U.S. PATENT DOCUMENTS

| 320,683 | 6/1885 | Phillis | 285/373 |
|---|---|---|---|
| 2,570,224 | 10/1951 | Fason | 285/382.7 |
| 3,249,370 | 5/1966 | Brogden | 285/114 X |
| 3,252,192 | 5/1966 | Smith | 285/114 X |
| 3,700,519 | 10/1972 | Carter | 156/289 |
| 3,902,747 | 9/1975 | Weinhold | 285/419 X |
| 4,045,060 | 8/1977 | Daigle | 285/373 X |
| 4,053,343 | 10/1977 | Carter | 156/272 |
| 4,109,941 | 8/1978 | Word et al. | 285/114 X |

FOREIGN PATENT DOCUMENTS 403414 6/1966 Switzerland .................... 285/114

Primary Examiner—Dave W. Arola
Attorney, Agent, or Firm—Shapiro and Shapiro

[57] ABSTRACT

A coupling assembly particularly for connecting sections of plastic pipe comprises a sleeve and a clamp assembly. The sleeve has internal seals for providing a seal between the sleeve and pipe sections inserted into the sleeve. The clamp assembly comprises two identical clamp members, each generally arcuate in shape, adapted to fit in opposing relationship and formed for connection to each other. The clamp members are each formed with a serrated inner surface to bite into the outer surface of the adjoining pipe section. The coupling assembly may be easily and quickly installed without special tools or equipment and is especially useful for the field repair of damaged pipe sections.

8 Claims, 6 Drawing Figures

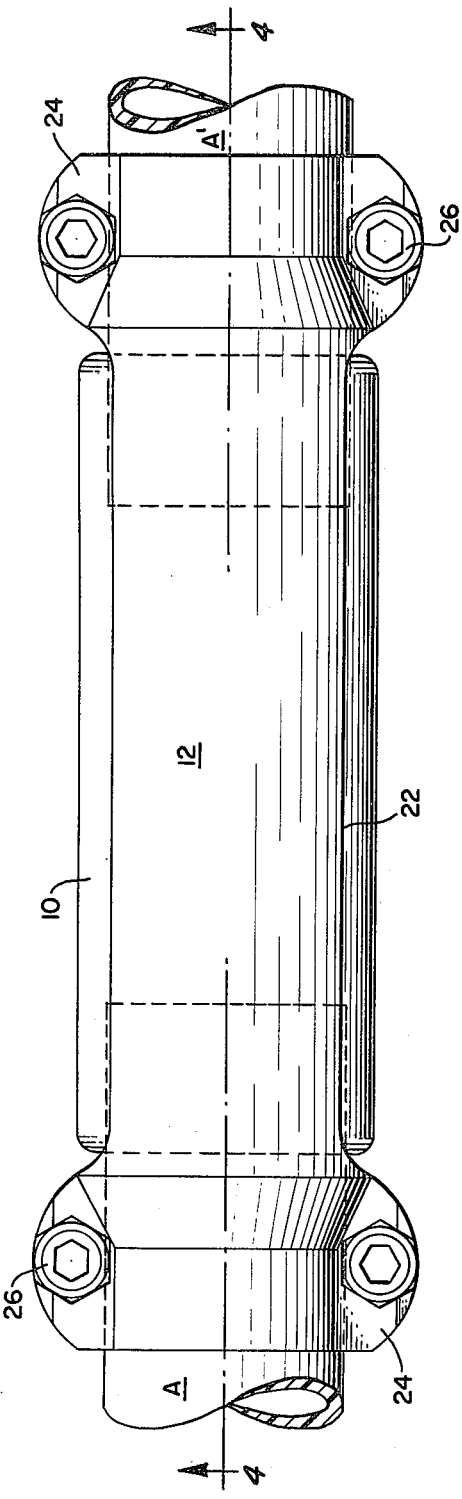
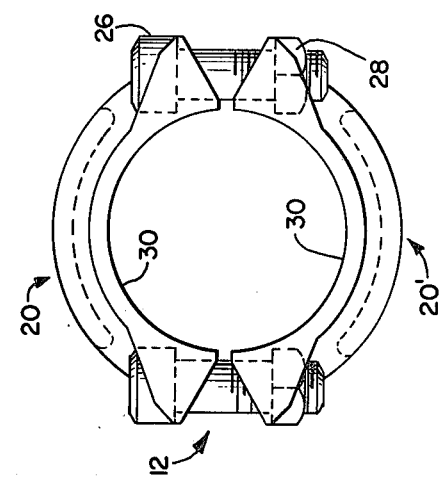
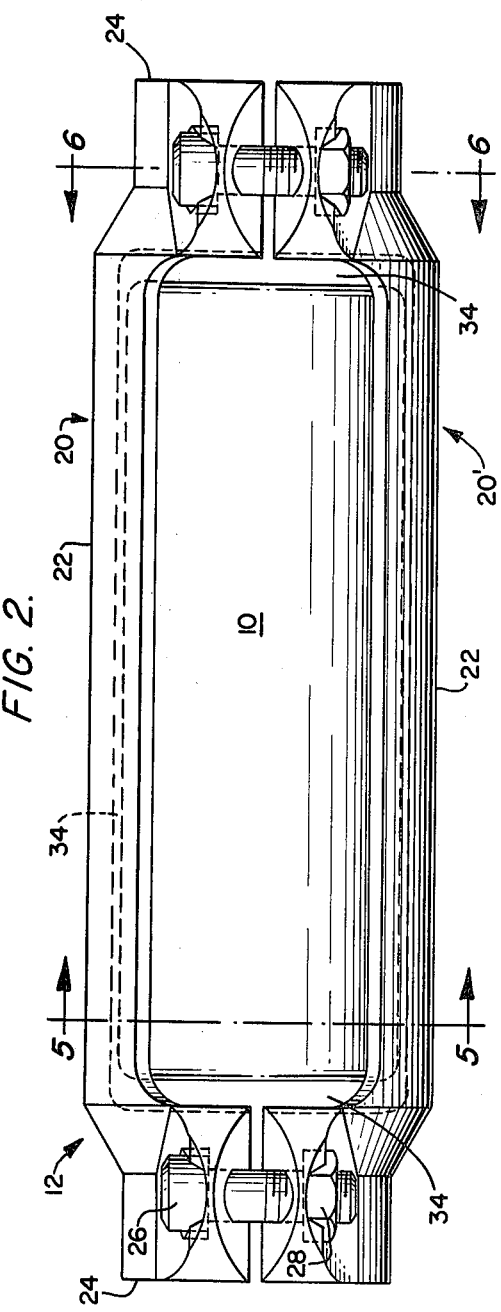

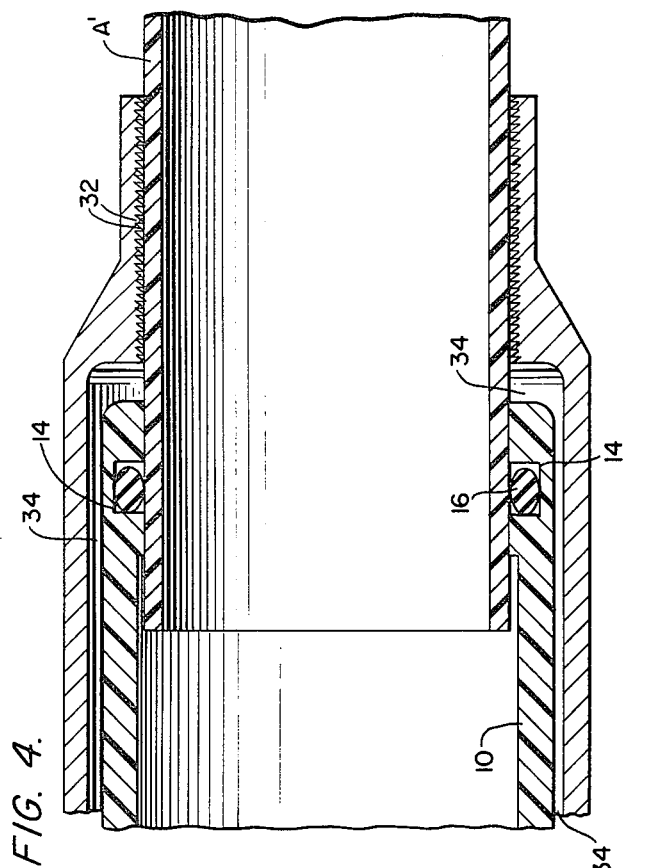
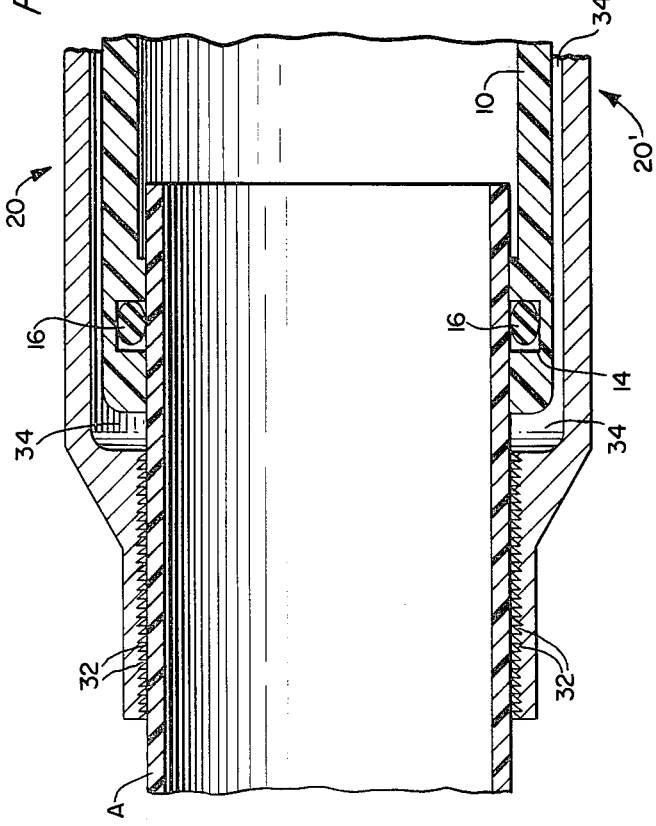
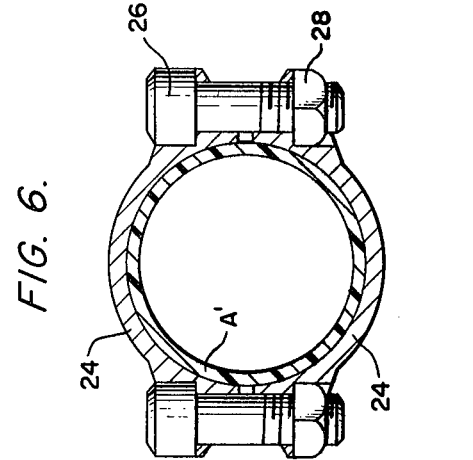
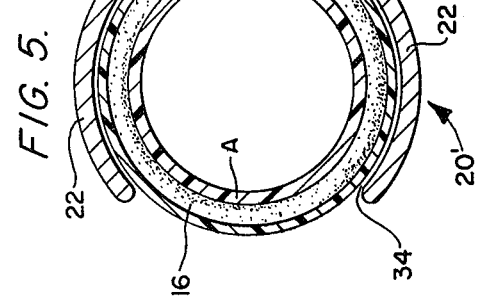

PIPE COUPLING

BACKGROUND OF THE INVENTION

This invention relates generally to coupling assemblies and more particularly to coupling assemblies suitable for the field repair of damaged pipes. The invention is especially useful for the repair of fiber reinforced thermosetting resin plastic pipe of the type disclosed in Carter U.S. Pat. Nos. 3,700,519 and 4,053,343 assigned to the same assignee as the present invention.

When pipes carrying gases or liquids are damaged in a field environment, it is generally necessary to have means available for quickly and easily repairing the damaged pipe sections. Usually this is accomplished by cutting the pipe to remove the damaged section and replacing it with a coupling assembly to connect the two ends of the undamaged pipe. Such repairs must provide an effective pressure-tight seal so that the fluid being carried by the pipe does not leak at the junctions of the pipes to the coupling. Furthermore, the coupling must serve to hold the ends of the undamaged pipe in securely coupled relationship when the joint is subjected to forces acting axially, in torque and in bending.

Because of its greater resistance to corrosive fluids and substantial mechanical strength, plastic pipe of the type described in the patents referred to above is being used extensively in the chemical industries. The usual method for joining plastic pipe sections of this type is by cementing. While such technique is acceptable for original installations, it is not convenient for the field repair of damaged pipe sections in an existing installation. Cementing plastic pipe sections requires a certain amount of expertise and special equipment which may not be available in the field. Furthermore, such technique cannot be accomplished rapidly. Accordingly, a number of coupling assemblies for connecting plastic pipe sections in the field have been developed. Such assemblies typically include a sleeve which provides a seal between juxtaposed or abutting pipe sections for containing the fluid flowing therethrough, and clamping means for clamping the pipe sections in coupled relationship to prevent separation of the coupled sections.

Daigle U.S. Pat. No. 4,045,060; Aug. 30, 1977, discloses a pipe coupling assembly which includes a central cylindrical section having internal sealing rings for providing a seal between the central section and abutted pipe sections inserted therein. Split-ring pipe retaining end members are attached to the central section by means of bridging lugs. The split-ring retaining members are provided with apertured flanges so that the rings may be tightened together against the pipe by means of bolts. The inner surfaces of the split-ring retaining members are serrated to provide a secure anchor to the pipe sections being joined.

Fason U.S. Pat. No. 2,570,224; Oct. 9, 1951, discloses a pipe coupling which has a central cylindrical section having internal sealing rings. The outer diameter of each end of the central section is threaded and adapted to receive a nut which is coaxial with the pipe sections. The coupling is anchored to the pipe sections by means of split rings which are compressed between each end of the central coupling sections and the collar on the nuts, when the nuts are tightened on the central section. The split rings are provided with a sharp corner which bites into the pipe sections to hold them in place with the coupler. A coupling of this type requires pipe wrenches able to span the diameter of the central section and the coaxial nuts for its installation.

Wood et al U.S. Pat. No. 4,109,941; Aug. 29, 1978, discloses another coupling assembly for plastic pipes. The assembly includes a sleeve having longitudinally spaced grooves which receive O-ring seals and which is adapted to slip over the ends of juxtaposed pipe sections. Encasing tubing sections are placed around the outer diameter of the sleeve in the area of each O-ring. Split clamping rings with flanges for receiving bolts and joined by spacer bars overlay the central tubing section. The clamping rings connect to the pipe sections entering the coupling and have a plurality of spaced grooves which deform the surface of the pipe when the clamping rings are tightened thereon. This provides an anchor for securing the two pipe sections in the proper coupling relationship. The spacer bars are designed to apply pressure against the encasing tubing surrounding the sleeve. This coupling is overly complicated, requiring the use of separate encasing tubing surrounding the sleeve in order to provide a good seal.

In each of the coupling assemblies described above the clamping means and the sleeve or central section having the sealing means are interconnected. As a result, any mechanical stress imparted to the clamping assembly is transmitted to the sleeve or central cylindrical section, thereby lessening the effectiveness of the sealing means. In fact, the very interaction of the clamping means and the sleeve or central section causes the latter component to be subjected to mechanical stress.

It is desired to provide a coupling assembly having a simple construction, compact size, which requires no special tools to install, and moreover, which has the components of the assembly so constructed and related that the sealing means therof is capable of serving at optimum conditions free of mechanical stresses.

SUMMARY OF THE INVENTION

A primary object of the invention is to provide a new and improved coupling assembly.

A further object of the invention is to provide a new and improved coupling assembly which has a simple construction and which may be used to quickly and easily repair damaged pipe in a field environment.

A still further object of the invention is to provide a coupling assembly especially adaptable to connect plastic pipe sections.

An additional object of the invention is to provide a coupling assembly which requires no special tools for its installation and which can easily accommodate large variations in the outer diameter of the pipe being coupled.

It is also an object of the invention to provide a coupling assembly which may be disassembled and reused.

It is yet another object of the invention to provide a coupling assembly in which the central coupling element may be of the same material as the pipes being connected.

A coupling assembly for connecting sections of pipe according to the invention which satisfies these objectives and has other desirable advantages and features includes a tubular sleeve adapted to receive the ends of the pipe sections. The inside surface of the sleeve includes means for providing a pressure-tight seal between the pipe sections and the sleeve. A pair of generally arcuate clamp members are formed for connection to each other to form a clamp assembly. Each clamp member has an internal recess of such dimensions that when the clamp members are connected to each other about the sleeve, only the clamp members absorb the mechanical stresses exerted on the coupling. The clamp members about or surrounding the sleeve are spaced from and out of contact with respect to the sleeve. The sleeve affords the desired sealing function and is free of mechanical stresses.

In accordance with more specific aspects of the invention, each clamp member has flanged generally semi-cylindrical end sections, sized to fit about the pipe, and which form a split-ring clamp when the clamp members are fitted together in opposing relationship. The flanges are adapted for receiving fastening means for securing the clamp members together. The inner surface of the end sections includes means for securely gripping the outer surface of the pipe so that when the clamp members are fastened together about the sleeve, they hold the pipe sections together in securely coupled relationship.

Since the sleeve is out of contact with the clamp members, none of the longitudinal forces, torque or bending moments applied to the coupling assembly is borne by the sleeve. It is an advantage of the coupling assembly of the invention that the clamp members alone bear all of the mechanical stresses to which the coupling assembly is subjected. The sleeve is free to furnish a seal between the two pipe sections and to convey fluid from one pipe section to the other, while the clamp members which are firmly connected to the pipe sections absorb all of the mechanical stresses, longitudinal, torque and bending, which would otherwise be transmitted to the seal and conduit-imparting sleeve. Moreover, the described arrangement permits use of a sleeve of the same material as the plastic pipe, while enabling the clamp members to be made from different and more effective and heavier load bearing steel to overlie and protect the sleeve.

These and other objects, advantages, features and improved results afforded by the invention will become apparent from the following detailed description and drawings of a preferred embodiment thereof.

BRIEF DESCRIPTION OF THE DRAWINGS

FIG. 1 is a top plan view of the coupling of the invention;

FIG. 2 is a side elevation of the coupling of FIG. 1;

FIG. 3 is an end view of the coupling of FIG. 2;

FIG. 4 is a fragmentary sectional view of the coupling of FIG. 1 taken approximately along the line 4—4;

FIG. 5 is a sectional view of the coupling of FIG. 2 taken approximately along the line 5—5; and FIG. 6 is a sectional view of the coupling of FIG. 2 taken approximately along the line 6—6.

DETAILED DESCRIPTION OF THE PREFERRED EMBODIMENT

Referring to FIGS. 1 and 2, a coupling assembly for connecting pipe sections A, A' comprises a sleeve 10 and a clamp assembly 12. The sleeve is adapted to receive the ends of the pipe sections and is formed to furnish a pressure-tight seal between the outer surface of the ends of the pipe sections and the inner surface of the sleeve. The sleeve has an inner diameter slightly greater than the outer diameter of each pipe section, permitting it to receive the ends of the two pipe sections. Adjacent to each end of the sleeve on its inner surface, annular grooves 14 are provided for receiving O-rings 16 which provide a seal between the pipe sections and the sleeve. The O-rings are preferably circular in cross section and made of a resilient material which is impervious to corrosive fluids which may be carried by the pipe, for example, a suitable synthetic rubber compound as is well known in the art. The cross-sectional diameter of the O-rings and their internal and external diameters are selected in accordance with known O-ring practice.

The clamp assembly 12 is adapted to fit over the sleeve 10 and clamp upon the pipe sections A, A' to retain the pipe sections in a securely connected relationship in the sleeve. The clamp assembly may be formed by a pair of identical, generally arcuate members 20, 20' formed for connection to each other. Each clamp member has a central portion 22 and flanged end sections 24. The length and inner diameter of the central portion of the clamp members are preferably slightly greater than the length and outer diameter, respectively, of the sleeve, so that the clamp members may be connected together in opposing relationship over the sleeve spaced therefrom, and the flanged end sections are able to engage and clamp to the two pipe sections. When the two clamp members are in place about the sleeve, the end sections form a split-ring clamp which clamps to the outer surface of the pipe. Apertures are provided in the flanged portions of the split-ring end sections, to permit the pair of clamp members to be fastened together to form the clamp assembly. Preferably, this is accomplished with threaded fasteners such as bolts 26 and hex nuts 28, which enable the two halves of the clamp assembly to be drawn together to grip the pipe sections A, A'. Although bolts and nuts are illustrated in the preferred embodiment, any suitable fastening means may be utilized, for example, longitudinally spaced bands about the assembly. Moreover, one clamp member may have threaded apertures to receive the bolts, thereby eliminating the need for the nuts.

It is an advantage of the invention that the clamp members 20, 20' may be constructed to be identical. This reduces their cost, obviates the need for maintaining a stock number of different types of components, and facilitates the installation of the coupling assembly since the two clamp members do not have to be oriented in a particular manner to be connected.

As illustrated in FIG. 5, the central portion 22 of each clamp member has a crescent-shaped cross section. Preferably, the angle subtended by each crescent-shaped portion is approximately 90°, although this angle may be made larger or smaller as desired. In any event, however, the angle should be sufficiently less than 180° so that the clamp members may be connected together securely upon the pipe without interference between adjacent edges of the central portions. The end sections of each clamp member are generally semi-cylindrical, as illustrated in FIG. 3, and dimensioned so that the split-ring clamps formed when the two clamp members are connected together can accommodate variations in the diameters of the pipe sections. When the two clamp members are in place about the sleeve, they overlie and protect the sleeve.

The inner surfaces 30 of the split-ring end sections may have a plurality of serrations or threads 32 which bite into the surface of the pipe when the two clamp members are fastened together. The serrations are preferably slanted inwardly towards the center of the clamp and the ends of the pipe inserted into the sleeve. Thus, axial forces which tend to force the pipe out of the coupling cause the serrations to bite deeper into the surface of the pipe and thereby grip the pipe more securely. The length of the inner surface of the split-ring end sections in contact with the surface of the pipe is made sufficient to ensure adequate engagement between the clamp assembly and the pipe to securely anchor the pipe sections in securely coupled relationship in the sleeve and to overcome longitudinal, torque, and bending forces tending to separate the pipe sections from the clamp members.

As illustrated in FIGS. 2, 4 and 5, the central portion of each clamp member is formed with an internal recess 34. The internal recesses are dimensioned with respect to the sleeve so that when the clamp members are in place about the sleeve, the sleeve is spaced from and out of contact with respect to the clamp assembly, both longitudinally and radially. As a result, in use, the sleeve is relieved of mechanical stresses, longitudinal, torque and bending, which may be imparted to the coupling. The sleeve is free to convey fluid and furnish a seal. The clamp assembly is used to anchor the pipe sections in securely coupled relationship within the sleeve. The sleeve may be constructed from filament reinforced plastic material similar to that used for constructing the pipe. This is advantageous, for example, if the fluid being carried by the pipe is corrosive to metals.

Preferably, the clamp assembly is constructed from a rigid load bearing material such as steel. The clamp members may be fabricated in any of a number of ways known to those skilled in the art. They are particularly well suited for fabrication by casting. Because of its two-piece construction the clamp assembly may be quickly and easily installed around the sleeve. The recesses permit the clamp assembly to be moved easily with respect to the sleeve, which facilitates its installation. Since the clamp assembly is secured to the pipe sections by means of threaded fasteners, no special tools are required for its installation. Furthermore, the sealing arrangement comprising the O-rings and annular grooves internal to the sleeve permit large variations in the outer diameter of the pipe being connected, while still providing adequate sealing. These features make the coupling particularly adaptable to the field repair of damaged pipe. In addition, the construction of the coupling assembly is such that it may be disassembled and reused if desired. Although the coupling is especially suited to coupling plastic pipes, it may be used equally as well for coupling pipes made from metal or other materials.

Usually, field repairs of plastic pipe involve only a few inches of damaged pipe. The coupling assembly of the invention may be used conveniently to replace up to about six inches of pipe. If larger sections must be replaced, this can be easily accomplished by using two coupling assemblies to splice in a length of pipe to replace the damaged section.

While the foregoing description has been with reference to a particular embodiment, it will be appreciated by those skilled in the art that numerous variations are possible without departing from the spirit and the intent of the invention, which is intended to be limited only by the appended claims.

What is claimed is:

1. A coupling for connecting sections of pipe comprising a tubular sleeve adapted to receive the ends of the pipe sections, the inside of the sleeve having sealing means for providing a pressure-tight seal between the pipe sections and the sleeve; and a pair of clamp members formed for connection to each other about the sleeve and pipe sections, and means for connecting the clamp members together about said sleeve and pipe sections, each clamp member having a generally arcuate cross section providing an internal recess for receiving the entire sleeve, and each said clamp member having gripping means thereon to grip each pipe section, the dimensions of the recess being such that when the clamp members are connected to each other about the sleeve and pipe sections, the clamp members are spaced from the sleeve and are out of contact with the sleeve, and said gripping means grip said pipe sections so that the clamp members absorb mechanical stresses and the sleeve is free of mechanical stress.

2. The coupling of claim 1 wherein each clamp member has a central section having a crescent-shaped cross section and wherein each end forms a split-ring clamp portion.

3. The coupling of claim 2 wherein the central section is adapted to partially surround the sleeve such that when the clamp members are connected together, the clamp members protect the sleeve from damage.

4. The coupling of claim 1 wherein each clamp member has end sections adapted for said connection of the clamp members to each other, the end sections including said means for gripping the pipe sections so that when the clamp members are connected together upon the pipe sections, the pipe sections are held in connecting relationship with each other.

5. The coupling of claim 4 wherein the pipe gripping means includes serrations formed on the inner surfaces of the end sections which bite into the outer surface of the pipe.

6. The coupling of claim 5 wherein the serrations are angled inwardly toward the ends of the pipe sections, such that the serrations oppose forces exerted on the pipe sections tending to separate the pipe sections from the coupling.

7. The coupling of claim 4 wherein each end section is flanged and forms part of a split-ring clamp.

8. The coupling of claim 7 wherein the end sections include apertures in the flanged portions thereof and said means for connecting the clamp members together includes threaded fasteners.

* * * * *